United States Patent [19]

Wolf et al.

[11] Patent Number: 4,861,003
[45] Date of Patent: Aug. 29, 1989

[54] CUP-SHAPED HYDRAULIC BEARING

[75] Inventors: Franz J. Wolf; Hubert Pletsch, both of Bad Soden-Salmünster, Fed. Rep. of Germany

[73] Assignee: WOCO Franz-Josef Wolf & Co., Fed. Rep. of Germany

[21] Appl. No.: 146,090

[22] Filed: Jan. 20, 1988

[30] Foreign Application Priority Data

Jan. 20, 1987 [DE] Fed. Rep. of Germany ....... 3701490

[51] Int. Cl.⁴ .................. F16F 13/00; B60K 5/12
[52] U.S. Cl. .................. 267/140.1; 248/562;
248/636; 267/35; 267/219
[58] Field of Search ........... 267/140.1, 140.5, 141.2,
267/35, 219; 248/562, 636, 638; 188/315;
180/290, 312

[56] References Cited

U.S. PATENT DOCUMENTS

| 2,806,375 | 9/1957 | Wood | 267/35 |
|---|---|---|---|
| 4,460,168 | 7/1984 | Obadal | 267/140.1 |
| 4,632,372 | 12/1986 | Nakajima et al. | 248/562 X |

FOREIGN PATENT DOCUMENTS

| 3637294 | 5/1988 | Fed. Rep. of Germany . | |
|---|---|---|---|
| 1260067 | 3/1961 | France | 267/140.1 |
| 0914167 | 12/1962 | United Kingdom | 267/219 |

Primary Examiner—Andres Kashnikow
Assistant Examiner—Matthew C. Graham
Attorney, Agent, or Firm—Burns, Doane, Swecker & Mathis

[57] ABSTRACT

The bearing includes of a beaker-type housing part in which a soft rubber support spring is arranged bearing a load supporting plate which is enclosed by a disc-type control spring arranged transversely to the support spring. The combination of the control spring and the load support plate is clamped radially pre-stressed in the upper portion of the beaker-type housing part such that the beaker-type housing part is hermetically closed in a gas-tight and liquid-tight manner. A clapper-type damping piston is suspended in a recess at the lower side of the load support plate and is free to move in an axial direction; The piston head is slidably fitted in a substantially exactly fitting manner into a cylinderical tube attached to the bottom of the beaker-type housing part. The hermetically closed bearing is filled with a damping liquid. When the load supporting plate starts its vibration and pushes the piston into the cylindrical tube, the damping liquid enclosed in the lower part of the damping cylinder is displaced either through a throttle opening at the bottom of the damping cylinder and/or through an annular gap between the piston and the inner surface of the cylindrical tube.

25 Claims, 1 Drawing Sheet

CUP-SHAPED HYDRAULIC BEARING

BACKGROUND OF THE INVENTION

The present invention relates to a bearing and more particularly, a bearing for engine suspension in a motor vehicle.

A bearing according to the state of the art German Patent Application P 36 37 294.3. That bearing is a rubber-metal bearing showing an unusually soft spring characteristic curve and having a high mechanical rigidity, especially shear rigidity, which is unusual for such bearings. In addition, the bearing has a very good insulating behaviour with respect to body-transmitted acoustic waves. This means that the supporting part and the part to be supported are acoustically decoupled. However, said bearing according to the state of the art is not damped.

OBJECTS AND SUMMARY OF THE INVENTION

Based on this state of the art, it is an object of the present invention to provide a soft and mechanically strong bearing, especially a rubber-metal bearing, which shows an insulating behaviour with respect to body-transmitted acoustic waves, with effective and adjustable damping facilities without deteriorating the above mentioned characteristics of the bearing.

Thus, it is a basic idea of the present invention to enclose hermetically the supoort spring of the bearing made of an elastomer material, especially a substantially cylindrical rubber spring with a central hole, in a beaker-type housing part open at one side. The open side of the beaker-type housing part is closed hermetically in a gas-tight and liquid-tight manner, by a load supporting plate and a flat radially compressed disc-type elastomer element acting as a control spring, the load supporting plate and control spring being connected to each other in a gas-tight and liquid-tight manner. Such a bearing can be filled either by a noncompressible damping fluid, especially a damping liquid, or by a compressible gas, which will be in practise normally atmospheric air. The compressible fluid may be enclosed either with excess pressure or with atmospheric pressure.

If the closed bearing is filled with a compressible fluid, which will normally be atmospheric air or another gas, the spring characteristics and the damping characteristics of such a bearing are determined by three elastic systems influencing each other. These are the spring characteristics of the support spring, the control spring and the pneumatic spring formed by the hermetically closed arrangement of the bearing.

A bearing according to the present invention is filled with a noncompressible damping liquid. However, in contrast to known hydraulic bearings, a bearing according to the present invention comprises no additional chamber for the damping liquid and the support spring does not serve as a pressure resisting wall for the pressure chamber of the damping system. This is why the support spring of a bearing according to the present invention can be adjusted to be very soft, for example formed like a rubber buffer comprising a central hole, whereby, in contrast to known hydraulic bearings, very good damping facilities with respect to acoustic body-transmitted waves can be achieved. This means that the load supporting part and the part to be supported are acoustically decoupled. In further contrast to known hydraulic bearings, in a bearing according to the present invention the damping liquid displaced when there is a load acting onto the load supporting plate deforms the disc-type control spring. The control spring does not influence the spring characteristics of the bearing too much even if it is adjusted relatively rigid and/or deformed relatively strong, because the value of the spring constant of the control spring fixed under radial stress in its neutral principal plane is about zero with respect to the direction normal to its radial plane. The limitation of the axial spring deflection path to a more or less narrow range around the neutral position is effected preferably by additional means for limiting the spring deflection path of the control spring. This means may be one or two stacked disc-type or annular stop means arranged normal to the direction of the spring deflection path of the support spring and the control spring and fixed either to the load supporting plate or to the upper part of the beaker-type housing part. These stop means may be flat or comprise a profiled section. The means for limiting the spring deflection path can be formed by taking into consideration the rigidity and the pre-stress of the control spring and the hardness of the elastomer material of the control spring whereby, the damping characteristics of a bearing according to the present invention can be adjusted in a wide range according to the requirements of many applications.

The damping characteristics of the bearing can be influenced and adjusted, in part, because upper portion of the beaker-type housing part comprises a significantly larger inner diameter than the remaining main portion of the beaker-type housing part. In that way, there will be achieved a softer axial deformation behaviour of the disc-type control spring without substantially influencing the radial rigidity of the control spring.

One of the most important problems when using such bearings, especially in motor vehicle construction, is the unsatisfactory acoustic decoupling and/or damping characteristics between the supporting part and the part to be supported. This applies especially to known hydraulic bearings wherein body-transmitted vibrations acting upon the load supporting plate, especially vibrations of an engine, are transmitted directly to the damping liquid and accordingly directly to the bearing part, i.e., to the chassis in the case of vehicle construction. In a bearing according to the present invention, these acoustic coupling concerns, which can be seen as an "acoustic short-circuit", are preferably eliminated because the surface areas of the load supporting plate facing the inner chamber of the hermetically closed bearing filled with a damping liquid are completely coated with or imbedded in an elastomer layer. The thickness of this elastomer layer can be adapted to the requirements of the specific application.

In a preferred embodiment of a bearing according to the present invention as disclosed above, vibrations with relatively small amplitudes, i.e., normally high-frequency acoustic vibrations, are damped with high efficiency while having soft spring characteristics. In the case of vibrations with larger amplitudes, especially low-frequency acoustic vibrations, in particular at or below 20 Hz, additional measures with respect to damping facilities have to be taken. For that purpose, namely for achieving good damping facilities regarding vibrations with relatively large amplitudes, a bearing according to the present invention preferably comprises a clapper-type piston including of a piston head, a piston shaft and a piston base. The piston is suspended at its base with at least axial free motion, and preferably with radial free motion too, at the lower part of the load supporting plate. The piston is slidably fitted into, in a substantially exactly fitting manner, a cylindrical tube and the tube is fixed to the bottom of the beaker-type housing part open at its upper side facing the load supporting plate and protruding into the support spring formed as a cylindrical ring-shaped elemennt with thick walls.

Especially for acoustic damping purposes, but also for influencing the mechanical damping characteristics of the bearing, the piston head of the piston is completely coated with an elastomer material. The piston head may be shaped like a sphere, an egg, a drop or a pear to achieve a certain radial elastic flexibility between the supporting part and the part to be supported. The shape can be adapted to the specific application.

The cylindrical element, which is formed normally by a cylindrical tube which is open completely at its upper side facing the load supporting plate, is at its other end facing the bottom of the beaker-type housing part either closed or provided with a throttle opening or a throttling back valve which opens from inside the cylindrical tube to the surrounding beaker-type housing part. If the cylindrical tube is closed at its lower end facing the bottom of the beaker-type housing part, the piston head merging into the cylindrical tube is designed by its dimensions and/or the type of its rubber coating such that there is formed an annular throttle gap between the outer surface of the piston head and the inner wall of the cylindrical tube. Alternatively, such an annular throttle gap can develop at the beginning of the vibration when at the beginning of the vibration of the load supporting plate, the piston is pushed into the cylindrical tube filled with damping fluid. When the piston moves back, the previously displaced damping liquid streams back into the damping cylinder as a result of suction pressure at the bottom of the cylindrical tube. As mentioned above, the piston base is suspended or pivoted at the lower part of the load supporting plate. Of special importance with respect to the damping characteristics of the whole bearing is that the suspension of the piston base at the load supporting plate allows a free axial motion which is preferably at least as large enough that the load supporting plate can move freely, i.e., without influencing the damping piston, when vibrations with smaller amplitudes are acting thereon. Not until larger amplitudes, i.e., amplitudes larger than the amplitude which permits free motion between the damping piston and the load supporting plate, act on the load supporting plate, the is the damping piston driven by the load supporting plate and slid axially in the damping cylinder.

The suspension of the piston base at the load supporting plate preferably takes place in a recess of the load supporting plate enclosing the piston base. That recess is coated with an elastomer layer or coating which is preferably a part of the disc-type control spring such that the control spring encloses the load supporting plate.

In this respect it must be emphasized once more that the damping characteristics of a bearing according to the present invention can be adjusted in many ways and very simply. The bearing can be adapted to vibrations with small amplitudes as well as to vibrations with large amplitudes in various easy manners, for example by adjusting the free motion between the piston base and the load supporting plate, by shaping the piston head in a certain way, by adjusting the dimensions of the inner surface of the cylindrical tube and the largest diameter of the piston head relative to each other and by adjusting the rigidity and thickness of the elastomer layer at the piston head. Additionally, the thickness and the diameter of the disc-type control spring which is deformed by the displaced damping liquid, influence the damping characteristics.

The invention will now be explained in more detail by examples of embodiments with reference to the accompanying drawings.

DETAILED DESCRIPTION OF THE PREFERRED EMBODIMENTS

Figure 1:
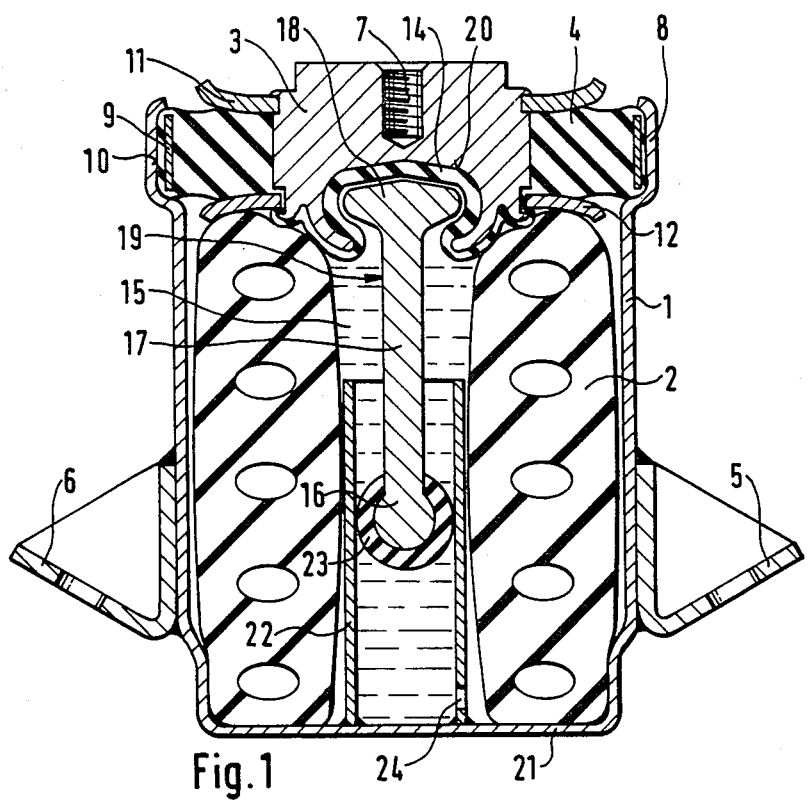
FIG. 1 is an axial cross-section of a first embodiment of a bearing according to the invention.

In FIG. 1 there is shown in an axial cross-section of an embodiment of a bearing according to the present invention which is used for engine suspension in a motor vehicle. The bearing consists of a beaker-type housing part 1, into which a support spring 2 is inserted for bearing a load supporting plate 3 to which a disc-type radially compressed axially bistable control spring 4 is attached. The disc-type control spring 4 encloses the load supporting plate 3 circularly while being mechanically and rigidly connected to the load supporting plate 3 in a gas-tight and liquid-tight manner. The support spring 2 is a soft rubber spring with a central hole. At both sides of the beaker-type housing part 1 fixing elements 5, 6 are attached by which the beaker-type housing part 1 is connected to a support element which is in this embodiment the chassis of a motor vehicle. For the same purpose, the load supporting plate 3 comprises an internal thread 7 in a blind hole by which thread 7 the load to be supported, which is in this embodiment the engine of a motor vehicle, is connected to the bearing.

The mechanically rigid and gas-tight and liquid-tight combination of the load supporting plate 3 and the disc-type control spring 4 is inserted in a axially determined position in a gas-tight and liquid-tight manner into the upper portion 8 of the beaker-type housing part 1. The attachment is effected preferably by a clamping ring 9 which is inserted into a groove 10 circularly closed by bedding at the upper portion 8 of the beaker-type housing part 1.

An optimum function of the bearing requires that the disc-type control spring 4 radially pre-stressed by a compression force, is fixed at least essentially in the planes of its principal surfaces. For that purpose, as can be seen in FIG. 1, two disc-type means 11, 12 limiting the spring deflection path are provided which are attached to the load supporting plate 3 at both sides of the principal surface of the control spring 4 sitting close to said control spring. The two discs 11, 12 can be flat or profiled.

Figure 2:
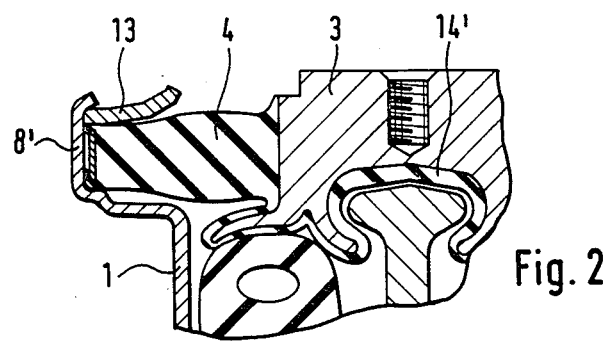
FIG. 2 is an axial cross-section of a portion of another embodiment of the present invention similar to the bearing shown in FIG. 1.

A similar embodiment of a bearing according to the present invention is shown in FIG. 2. In this figure, there is shown an annular disc-type limiting means 13 which serves for stabilizing the control spring 4 in a neutral position, too, but, in contrast to the disc-type limiting means 11, 12 shown in FIG. 1, this annular disc-type limiting means 13 is not attached to the load supporting part 3 but to the upper portion 8' of the beakertype housing part 1 at the rim of the upper portion 8'.

Furthermore, in the embodiment of the present invention shown in FIG. 2, it can be seen that the upper portion 8' of the beakertype housing part 1 enlarged significantly with respect to its diameter.

In both embodiments shown in FIGS. 1 and 2, the surface areas of the load supporting plate 3 facing the inner chamber of the beaker-type housing part 1 are completely coated with a damping elastomer layer 14 which serves first of all for acoustic damping purposes and for decoupling acoustically the load supporting plate 3 and a damping fluid 15 inside the bearing. In the embodiment shown in FIG. 2, the elastomer coating 14' is formed, for example by injection molding, in one part together with the control spring 4. The control spring 4 as well as the elastomer coating 14' are injected in one single process and afterwards vulcanized to the load supporting plate 3.

As can be seen in FIG. 1, a clapper-type piston 19 consisting of a piston head 16, a piston shaft 17 and a piston base 18 is suspended with its piston base 18 in a recess 20 formed at the lower side of the load supporting plate 3 facing the bottom 21 of the beaker-type housing part 1 allowing a certain axial and radial free motion. The inner surface of the recess 20 is coated completely with the elastomer material 14. The piston head 16 is slidably fitted, in a substantially exactly fitting manner into a cylindrical tube 22 which is attached to the bottom 21 of the beaker-type housing part 1. The piston head 16 is spherical and embedded completely in a relatively thick elastomer coating 23.

At the lower side of the cylindrical tube 22 facing the bottom 21 of the beaker-type housing part 1 is formed a small throttle opening 24 which enables the damping liquid 15 to stream out of the cylindrical tube 22 to the surrounding beaker-type housing part 1 in a throttled manner when the load supporting plate starts vibrating and pushes the piston 19 into the cylindrical tube 22.

This means that the damping liquid 15 displaced by the vibrating load supporting part 3 streams from the axial central region to the peripheral region of the beaker-type housing part 1. In that way a certain excess pressure is developed which deforms the control spring 4 axailly outwards.

The bearing used for engine suspension shown in FIG. 1 is characterized by very soft spring characteristics, by a high mechanical rigidity and stiffness, especially shear rigidity and shear stiffness, by extraordinarily good acoustic insulating characteristics with respect to acoustic decoupling facilities between the load supporting plate 3 and the fixing elements 5, 6 and by high-efficiency elastical damping characteristics with respect to small amplitudes (and high frequencies) as well as large amplitudes (and low frequencies).

The priciples, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others without departing from the spirit of the present invention. Accordingly, it is expressly intended that all such variations and changes which fall within the spirit and scope of the present invention as defined in the claims, be embraced thereby.

What is claimed is:
1. A bearing comprising:
   a beaker-type housing;
   a soft support spring positioned within said beaker-type housing;
   a load supporting plate bearing upon an upper end of said support spring;
   a disc-type radially compressable bistable control spring coupled to and circularly enclosing said load supporting plate, said disc-type bistable control spring in combination with said load supporting plate hermetically closing said beaker-type housing in a gas-tight and liquid-tight manner;
   stop means for limiting a spring deflection path of said disc-type bistable control spring, said stop means being arranged normal to a spring deflection path of said support spring;
   a clapper-type piston comprising a piston head connected to a piston shaft and a piston base connected to said piston shaft, said clapper-type piston being suspended from a lower part of said load supporting plate and being axially movable with respect to said beaker-type housing; and
   a cylindrical tube attached to a bottom of the beaker type housing; said piston head being slidably positioned within said cylindrical tube in a substantially closely fitting manner.

2. A bearing according to claim 1, wherein an upper portion of said beaker-type housing has a larger inner diameter than the remaining portion of said beaker-type housing.

3. A bearing according to claim 2, wherein said stop means comprises two disc-type elements arranged normal to a deflection path of said disc-type bistable control spring and attached to said load supporting plate.

4. A bearing according to claim 2, wherein said stop means comprises at least one disc-type element arranged normal to a deflection path of said disc-type bistable control spring and attached to said load supporting plate.

5. A bearing according to claim 4, wherein surface areas of the load supporting plate located within the beaker-type housing are completely coated with a damping elastomer layer.

6. A bearing according to claim 5, wherein said piston head is covered with an elastomer material.

7. A bearing according to claim 6, wherein a lower side of the cylindrical tube includes means for regulating flow of a liquid.

8. A bearing according to claim 7, wherein said means for regulating flow comprises a throttle opening.

9. A bearing according to claim 8, wherein said beaker-type housing is completely filled with a damping liquid.

10. A bearing according to claim 2, wherein said stop means comprises one disc-type element arranged normal to a deflection path of said disc-type bistable control spring and attached to an upper portion of the beaker-type housing.

11. A bearing according to claim 10, wherein surface areas of the load supporting plate located within the beaker-type housing are completely coated with a damping elastomer layer which is formed integrally with the disc-type bistable control spring.

12. A bearing according to claim 11, wherein said piston head is covered with an elastomer material.

13. A bearing according to claim 12, wherein a lower side of the cylindrical tube includes means for regulating flow of a liquid.

14. A bearing according to claim 13, wherein said means for regulating flow comprises a throttle opening.

15. A bearing according to claim 14, wherein said beaker-type housing is completely filled with a damping liquid.

16. A bearing according to claim 1, wherein said stop means comprises at least one disc-type element arranged normal to a deflection path of said disc-type bistable control spring and attached to said load supporting plate.

17. A bearing according to claim 15, wherein said at least one disc-type element is a flat disc.

18. A bearing according to claim 1, wherein said stop means comprises two disc-type elements arranged normal to a deflection path of said disc-type bistable control spring and attached to said load supporting plate.

19. A bearing according to claim 1, wherein said stop means comprises at least one disc-type element arranged normal to a deflection path of said disc-type bistable control spring and attached to an upper portion of the beaker-type housing.

20. A bearing according to claim 19, wherein said one disc-type element is a flat disc.

21. A bearing according to claim 1, wherein surface areas of the load supporting plate located within the beaker-type housing are completely coated with a damping elastomer layer which is formed integrally with the disc-type bistable control spring.

22. A bearing according to claim 1, wherein a lower side of the cylindrical tube includes means for regulating flow of a liquid.

23. A bearing according to claim 22, wherein said means for regulating flow comprises a throttle opening.

24. A bearing according to claim 1, wherein said beaker-type housing is completely filled with a damping liquid.

25. A bearing according to claim 1, wherein surface areas of the load supporting plate located within the beaker-type housing are completely coated with a damping elastomer layer.

* * * * *